Nov. 10, 1959

D. O. SEEVERS 2,912,164

SEISMIC RECORD STATISTICAL COMPUTER

Filed May 2, 1955

INVENTOR
DELMAR O. SEEVERS

BY C. J. Tonkin

Ron Rogers Jr.

ATTORNEYS

Nov. 10, 1959  D. O. SEEVERS  2,912,164
SEISMIC RECORD STATISTICAL COMPUTER
Filed May 2, 1955  5 Sheets-Sheet 2

INVENTOR
DELMAR O. SEEVERS
BY
ATTORNEYS

INVENTOR
DELMAR O. SEEVERS
BY
ATTORNEYS

United States Patent Office 2,912,164
Patented Nov. 10, 1959

2,912,164

SEISMIC RECORD STATISTICAL COMPUTER

Delmar O. Seevers, Fullerton, Calif., assignor to California Research Corporation, San Francisco, Calif., a corporation of Delaware Application May 2, 1955, Serial No. 505,213

6 Claims. (Cl. 235—193)

My invention relates to a computer and particularly to a computer for distinguishing signal and noise in a seismic record.

According to the seismic prospecting method, a charge of explosive is detonated near the surface of the earth and vibrations from the explosion are detected at several points on the earth. These vibrations are recorded as electrical signals. From these records, reflected energy from subterranean strata is identified and used to determine the geologic section. I have found that the seismic record represents much energy other than that from deep horizons. Accordingly, it is often difficult to extract the useful information from the record in the presence of the noise which is also recorded. The identification of the useful signal in the presence of noise is usually made by eye. My invention is a method and apparatus for making such identification by the use of a computer.

According to my invention, a computer is provided to analyze the record to extract the seismic signal from the background noise. All channels of the seismic recording are impressed by a high-frequency sampling commutator on a ten-level amplitude analyzer. The number of amplitude samples of the record lying in each level is counted and recorded. As the next step in processing the record, a gating circuit and timer impress amplitude samples on the amplitude analyzer at 1-millisecond intervals. The counts for each amplitude level are recorded separately. The recorder for each level has five count-storage units, each unit being arranged to count pulses received for 5 milliseconds. One count-storage unit in the counter for each amplitude level discharges its information to a computing circuit each millisecond so that counter units discharge a 5-millisecond count with millisecond spacing between discharges. The output of the counter units is squared and divided by a number proportional to the predetermined frequency count of the corresponding amplitude determined for an appreciable portion of the record. The outputs of the squaring and dividing circuits corresponding to each amplitude level are summed, filtered and recorded. Important aspects of my invention relate to the methods of performing these steps and the interaction of the components of our computer.

The novel features of my invention are set forth with more particularity in the accompanying claims. The invention itself, however, with respect to the details thereof, together with its additional objects and advantages, may be better understood from the following description of specific embodiments with reference to the accompanying drawings, in which:

Figure 1:
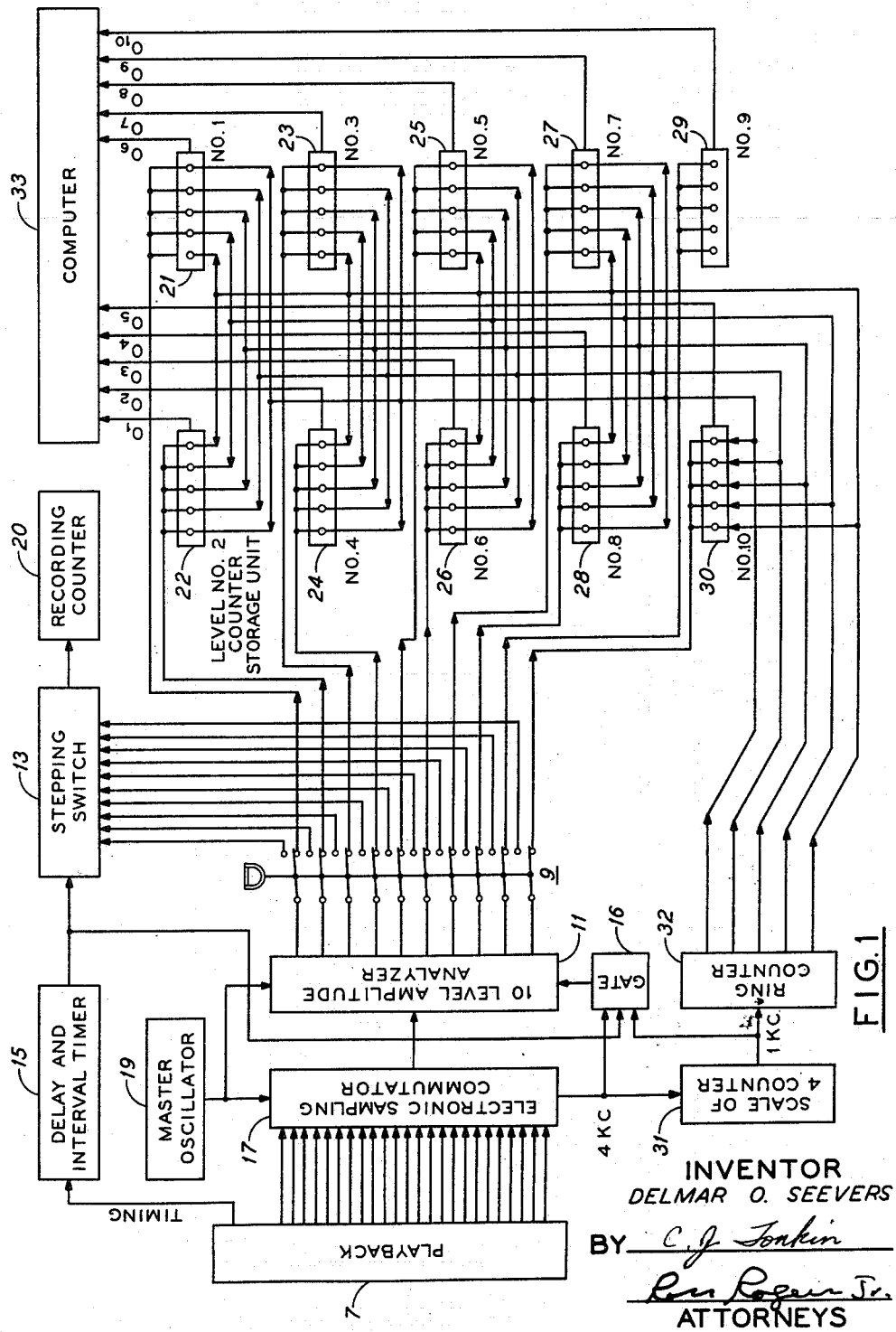
Fig. 1 shows a schematic diagram of a computer according to our invention.

The basic principle of my invention may be described with reference to an example.

Consider that I take a seismic record and measure the trace deflections for all traces, say, every millisecond. If I have 24 traces, and the record is two seconds long, I thus obtain 48,000 numbers. I can now break these numbers down into a histogram giving the frequency distribution of instantaneous trace amplitudes within certain ranges for the entire record. If the record is mostly noise and the reflections are weak, then this distribution represents essentially the amplitude distribution of the noise, where by noise I mean anything on the record which is not correlatable across the record. Let us now consider a certain time on the record and measure the trace deflections for all the traces at that time. If I have a sufficiently large number of traces and if the record is purely noise at that particular time, then the distribution obtained should not differ appreciably from the over-all distribution previously obtained because I am merely sampling the parent population by taking a sufficiently large sample. On the other hand, if a reflection were present at that time, then the traces would tend to be more nearly alike as reflected in the amplitude distribution. If the reflection has the same strength on all traces, the distribution obtained will be similar in shape to the parent distribution but will be translated with respect to it. Thus, by sampling across the traces, say, every millisecond and comparing these distributions with the parent distribution, I would expect to get good agreement in the presence of only noise and poor agreement if a reflection is superimposed on the noise.

A statistical test developed some time ago can be used to determine if two samples come from the same population. This test is called the chi-square test. The statistic $x^2$ is defined as:

$$x^2 = \sum_{i=1}^{n} \frac{(o_i - e_i)^2}{e_i}$$

where $n$ is the total number of levels into which the population is classified; the total number of $e_i$'s equal to the total number of $o_i$'s; $e_i$ is the expected frequency in the $i$th level; and $o_i$ is the observed frequency in the $i$th level.

The expected frequencies are determined from the parent distribution while the observed frequencies are those obtained for the distribution which is to be compared with the parent distribution. Applying this test to seismic traces, the $e_i$'s come from a large sample of the seismic record, while the $o_i$'s come from samples of the record which cover short periods of time. The probability distribution of chi-square has been computed and tabulated so that a given value of chi-square represents a known certainty for the hypothesis that the $o_i$'s and $e_i$'s come from identical populations. Generally, a large value for chi-square indicates a large likelihood that the two samples come from different populations. In my application of chi-square to the seismic environment, I have found that a high value for chi-square as based on a seismic record indicates a high likelihood that the record at the point represented by the $o_i$'s is not pure noise but contains a reflection from a subterranean horizon.

My invention involves the application of the above analysis in the following manner. First, the amplitudes of large sections of all traces of a single seismic record are analyzed to determine the frequencies of amplitudes occurring in certain predetermined ranges. Then all traces are examined at a particular time in the record to determine the distribution of amplitudes in the same ranges at that time. These measurements are repeated at subsequent times and used to compute chi-square as a function of time on the seismic record. From this time function of chi-square is discerned the time at which reflections appear on the seismic record. Before application of this procedure to the record, the normal moveout and dip may be removed and, subsequent to the computation of chi-square, the original record may be analyzed in the light of the chi-square information to determine the geologic section.

Referring now to the drawing, the apparatus shown in Fig. 1 computes chi-square in the form $$\chi^2 = \sum_{i=1}^{n} \frac{o_i^2}{e_i} - N$$

where $$\sum_{i=1}^{n} o_i = \sum_{i=1}^{n} e_i = N$$

defines N and the other values are defined above. To determine N, the seismic reproducible record, which may be a tape recording, is placed in the playback 7. The seismic record consists of a number of traces, each of which may be read off separately by a reproducing head in the playback 7. If there are twenty-four seismic traces and an alternating current timing trace, twenty-five reproducing heads are sufficient. The switch 9 is thrown from the positions shown, to the position which connects the 10-level analyzer 11 to the stepping switch 13. The delay and interval timer actuates the gate 16 to permit operation of the 10-level amplitude analyzer 11. The master oscillator 19, which may have a frequency of 100 kilocycles, causes the commutator to connect one reproducing head to the amplitude analyzer 11 for an instant. The 10-level amplitude analyzer emits a pulse when it is subjected to a signal having a voltage between predetermined limits. The 10-level amplitude analyzer has ten output circuits, and divides the range covered by the analyzer into ten equal voltage segments represented by the ten output circuits.

The stepping switch 13 connects the output circuit from one level to the recording counter 20, which counts a pulse if the amplitude of the seismic signal, as detected by the head of the playback, falls within the voltage interval of the level of the analyzer. The commutator 17 successively connects different readout heads of the playback 7 to the amplitude analyzer 11, and the recording counter 20 counts the number of traces which, at the instant when they are sampled by the commutator and analyzer, had a signal amplitude falling within the first voltage range of the analyzer. All traces of the entire record may be examined in this fashion, or a representative portion of the record may be analyzed. The reading on the recording counter is read.

Then, the stepping switch 13 indexes to its second position and connects the second analyzer output to the recording counter 20. The record is run through the playback again, and the delay and interval timer permits the analyzer 11 to be in operation for the same amount of time as previously. While the stepping switch 13 connects the second output of the analyzer to the counter 20, which counts the occurrences of signal amplitudes in the second voltage range in the seismic signals. This operation is repeated until the representative portion of the record has been played back ten times and the counter 20 has the total number of samples of the seismic signal falling within the amplitude range which is being analyzed. A record is made of the number of samples having an amplitude in each of the ten ranges.

This comprises the $e_i$'s. $e_1$ is the number of samples of the seismic signal which fall within the first voltage range. $e_i$ is the number of samples which fall within the $i^{th}$ range. N is then normalized. In the preferred practice of my invention, N=120 and $e_i$ is divided by the number which could be multiplied by 120 to equal the total number of counts of all levels obtained on the counter 20. The above-described procedure obtains the expected distribution of amplitudes in the seismic signal.

The ten levels were chosen because they are believed to provide sufficient accuracy. However, for more precise work, it may be necessary to analyze more than ten voltage levels. A stepping switch and a single recording counter are used, but equally good results would have been obtained if there had been one recording counter for each level of the amplitude analyzer. In that event, the time required to obtain the $e_i$'s would be decreased, since all $e_i$'s could be obtained simultaneously.

The next step in obtaining chi-square involves ascertaining the $o_i$'s. The seismic record is then again played through the playback 7, but the switch 9 is placed in the position shown so that the analyzer is connected to the counter storage units 21—30 through counter 30. The seismic record is played through the playback 7; the master oscillator 19 actuates the electronic commutator to sample successively the traces on the record, feeding this sample into the 10-level amplitude analyzer. Each time the amplitude of the seismic signal falls within a particular amplitude range, a signal is transmitted from the analyzer 11 to a counter storage unit. There are five counter storage units in the counter storage unit No. 1 and in all of the other counter storage units 22—30. All five of the counters in each level count the samples which fall within the corresponding level in the analyzer. All of the seismic traces are sampled at the frequency of the master oscillator, in this case 100 kc. Then the level analyzer is made inoperative by gate 16 for a period of time which, in this case, we prefer to make 0.75 millisecond. Then all of the traces are sampled again.

In explaining my invention, I am taking as an example a 24-trace seismic record. This record is sampled every millisecond, and five samples of each trace are employed. Thus, $$\sum_{i=1}^{n} o_i = 120$$

The traces must be sampled rapidly so that their amplitudes do not change appreciably during the taking of a single sample. All of the traces are sampled substantially simultaneously, but an interval is allowed between successive samples of the same trace in order to permit time for the seismic signal to change in amplitude. If the samples were taken too closely together, they would be unchanged in successive samples.

The ten-level counter storage units 21—30 each consist of five counters. The counters dump their stored information in sequence and begin to count again in sequence. In this manner, the number of samples of the seismic signal which fall within a given amplitude range is counted five times, and signals representative of $o_i$ are emitted by the counters 22—30 every five milliseconds.

The counters associated with one analyzer level are operated sequentially by an interconnection with the sampling commutator 17. Each time that the sampling commutator samples the signal from the twenty-fourth trace, it next operates on a separate circuit and transmits a pulse to the scale-of-four counter 31. The scale-of-four counter may be two cascaded stages of a binary counter. The input to the scale-of-four counter is at a frequency of 4 kc. The output of the counter 31, then, is 1 kc. which is fed to a ring counter 32 and gate 16. The ring counter counts input pulses and emits and output signal which dumps the contents of a corresponding storage unit in each of the counters 21—30. At the end of the first millisecond, the first counter of each level is dumped. At the end of the second millisecond, the contents of the second storage unit of each level counter are dumped. This process proceeds, and at the end of the fifth millisecond the contents of the fifth storage unit are dumped. As soon as any storage unit is dumped, it begins to accumulate counts. The result of this arrangement is that each storage unit counts for five milliseconds and is then dumped. The storage units are dumped in succeeding milliseconds as a result of the operation of the ring counter 32. The outputs of the counter storage units are the $o_i$'s which are introduced into the computer 33.

The computer uses the $o_i$'s to combine with the $e_i$'s to provide chi-square.

The operation of apparatus shown in Fig. 1 may be more fully described with reference to Fig. 5 which is a graph showing voltage as a function of time at the outputs of various circuit elements. On all of the graphs the ordinate is voltage and the abscissa is time. The top line of the graph shows the output of the master oscillator 19 in an expanded time scale; the other graphs in Fig. 5 use a single time base. The second line shows the output of the electronic sampling commutator 17 which is the input to the scale-of-four counter 31. Where a twenty-four trace seismic record is used, this signal is a twenty-fifth trace which marks the end of one sweep of the sampling commutator 17. The scale-of-four counter 31 counts four pulses from the computer, emitting a positive pulse at the end of four counts, and a negative pulse halfway between the positive pulses.

The output of the commutator 17 and of the scale-of four counter 31 are inputs to the gate 16. The delay and interval timer 15 also controls the gate 16, but the discussion with reference to Fig. 5 will deal solely with the interval in which the timer 15 permits the gate 16 to be operative. The fourth line of the graph in Fig. 5 shows the output of the gate 16 to the analyzer 11. Originally the gate is impressing a positive potential on the analyzer 11. Upon receipt of the first negative pulse from the commutator 17, the gate 16 lowers the potential on the analyzer 11. The gate 16 remains in this condition until it receives simultaneously a negative pulse from the commutator 17 and a negative pulse from the counter 31. It then impresses a voltage on the analyzer 11 until it receives the next negative pulse from the commutator 17. This sequence continues for a time until the interval timer 15 blocks the gate 16.

The ring counter 32 receives a signal from the scale-of-four counter 31. There are five contacts on the ring counter. Upon receipt of the first positive pulse from the counter 31, the first contact on the ring counter 32 is closed, decreasing the voltage impressed on the first counter storage unit of each level 21—30. Upon receipt of the second positive pulse from the scale-of-four counter 31, the first contact on the ring counter 32 is opened, raising the voltage impressed on the first storage units. At the same time, the second contact on the ring counter is actuated to lower the voltage impressed on the second storage unit of each level of the counters 21—30. The third positive pulse from the scale-of-four counter 31 raises the voltage impressed on the second storage unit and lowers the voltage impressed on the third storage unit. The voltages which the ring counter 32 impresses on the storage units are shown in the three graphs designated "ring counter." There are five such circuits, but only three are shown since they appear sufficient to explain the operation of the ring counter 32. Decreasing the voltage impressed on a storage unit dumps the charge stored in the storage unit into the computer 33.

Figure 5:
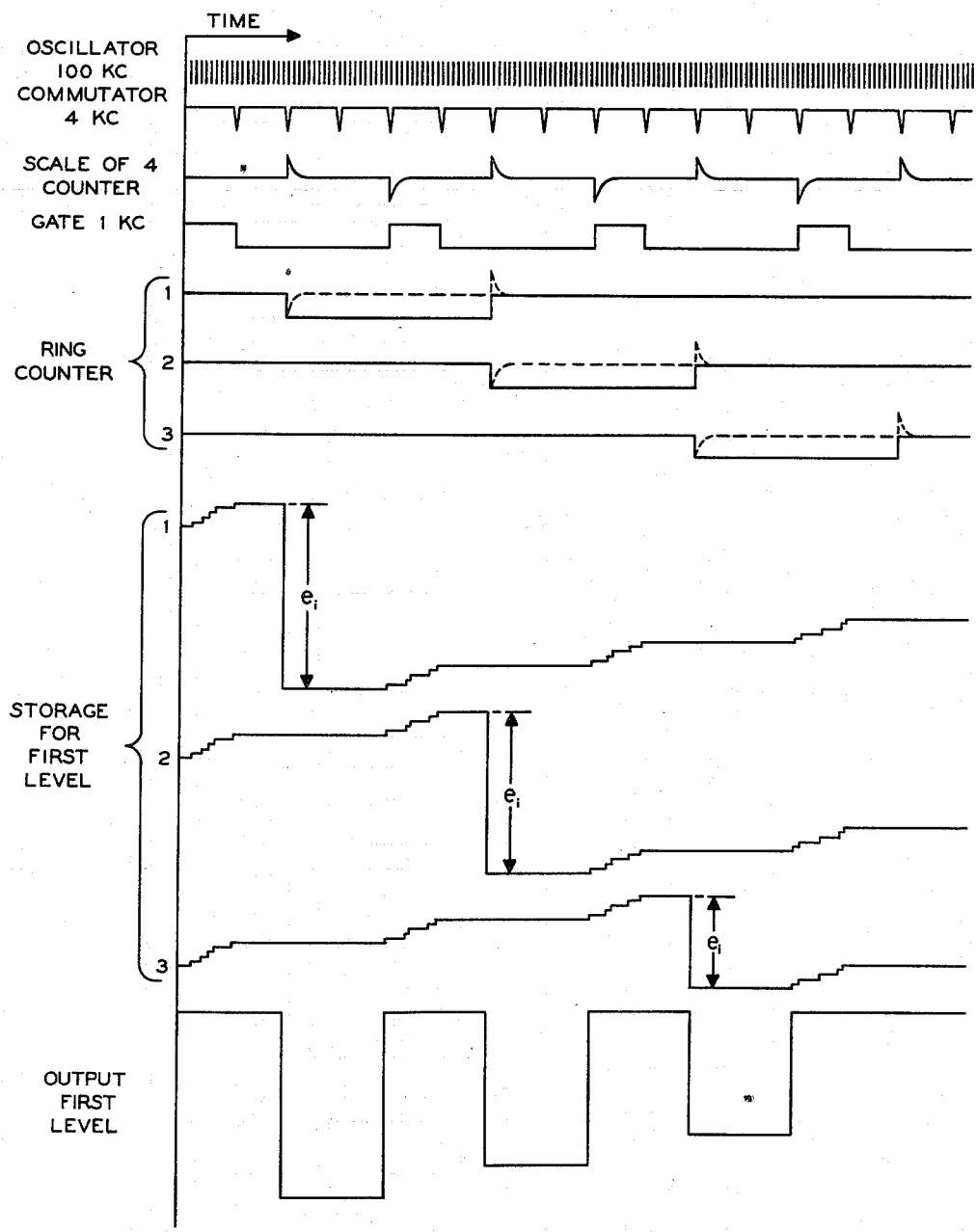
Fig. 5 shows graphs of electrical relationships in the various components of our computer.

The voltage across the output connections of three of the storage units of the first level of the counter storage unit is shown in Fig. 5. Each of the storage units receives the same charge since it is connected to the same output of the ten-level amplitude analyzer 11. When the first circuit of the ring counter 32 impresses a negative voltage on the input of the first storage unit of level number 1, the charge in the first unit is dumped into the computer 33. The voltage change represented by this dumping is designated $e_1$. The first storage unit then continues to accumulate charge from the analyzer 11 until it has accumulated the resulting counts from five cycles of the commutator 17 and is dumped by the ring counter 32. The second level of each storage unit is dumped when the voltage output of the second circuit of the ring counter 32 is rendered more negative. The third storage units are dumped when the third circuit of the ring counter 32 impresses a lower voltage. The output of the first level unit is a square wave having an amplitude equal to $e_1$ stored in each of its units. The computer 33 does not distinguish between signals from the different storage units of the first level. Each storage unit accumulates charge for 5 milliseconds. The five storage units are dumped at the end of successive milliseconds. Thus, after every millisecond, the first level unit 21 impresses a voltage on the computer 33 and this voltage represents the accumulation of counts for a period of five milliseconds.

Figure 2:
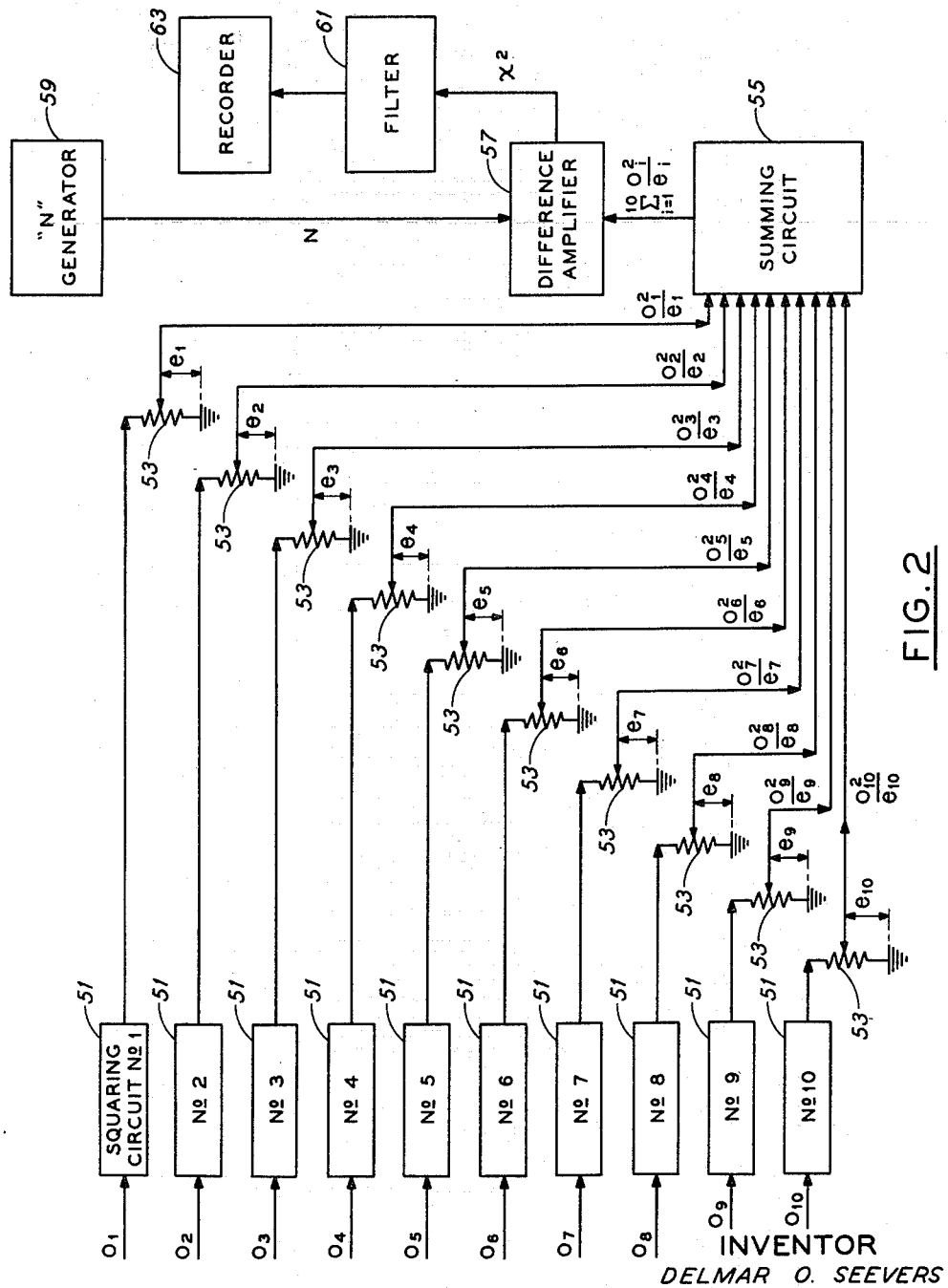
Figs. 2 and 3 show alternative circuits for performing a portion of the computation.

The apparatus shown in Fig. 1 consists preferably of a number of electronic components, most of which are known to the art, but these components are used in a different fashion in the practice of our invention. The playback 7 may be any apparatus which is capable of playing back an electric signal which has been recorded. I prefer to use a tape recorder in which twenty-five or more traces are recorded on a single tape by the use of multiple recording heads. Multiple playback heads play the recorded signals into the electronic commutator. An electronic commutator which may be easily adapted for use in my invention is shown in the November 1950 issue of "Electronics," page 94. This circuit also contains an oscillator corresponding to our master oscillator 19. The "Electronics" article shows a 32-channel commutator. This can be converted to a 25-channel commutator by changing the rings of eight and four to rings of five in the circuit shown on page 94. The gating scheme shown in Fig. 2 of "Electronics" is slower than my commutator should be. It may be speeded up by shortening by a factor of 3.125, the time that the gating tubes shown in Fig. 2 are operative. This can be accomplished by increasing the frequency of the master pulse generator from 32 kc. to 100 kc. by changing time constants. The inputs to the commutator are fed to the grids of the 6AS6 tubes shown in Fig. 3, page 96. The output is at the common output shown in Fig. 3, page 96.

The delay and interval timer 15 may be an adaptation of the batching counter shown in the magazine, "Electronic Engineering," April 1954, pages 160 ff. This apparatus shown in the publication operates to count at a rate of one hundred cycles per second. This counting rate would be sufficient for my purposes. The timing trace which is fed from the playback 7 to the delay and interval timer 15 is an alternating current signal which is recorded on the tape beside the seismic recordings for timing purposes. The frequency of this signal need not be over a hundred cycles per second. The timer counts cycles of the timing signal and thereby controls the operation of our apparatus. Referring to the publication, "Electronic Engineering," April 1954, the timing signal would be introduced to the counter circuit of Fig. 1, page 160, at the left-hand input to the control electrode of the GTE175M tubes. The batch size selectors are shown in Fig. 2, page 161. The output relay operates the switch 35 shown in Fig. 4 of our drawing.

The stepping switch 13 is a multiterminal relay. Such a relay connects a single circuit selectively to a number of other circuits. When the relay is first actuated, it connects the first circuit with the second circuit. Upon the next actuation of the relay, the first circuit is connected to a third circuit, and so on until, in my apparatus shown in Fig. 1, the recording counter 20 has been connected sequentially to each of the ten level outputs of the analyzer 11. The 10-level amplitude analyzer may be the apparatus shown in "Nucleonics," September 1952, page 37, Fig. 27. It is essentially a cathode ray tube having conductive plates, rather than a phosphor, on its face. A beam of electrons is emitted by the cathode and deflected according to the voltage amplitude of the signal from the commutator 17. The control grid of the analyzer is connected to the gate circuit shown in Fig. 4.

Each of the five storage units of the counters of each level 21—30 may be the staircase generator shown in "Electronics," March 1954, page 187 ff. The input pulses are introduced in the solenoid shown in Fig. 1, page 188, which may be the "register" of Fig. 27, "Nucleonics," September 1952, page 37. The capacitor $C_2$ is dumped to clear the circuit. This circuit must have the boot strapping in order to be linear. Instead of the relay shown in Fig. 1 on page 188, the switch may be a diode.

Figure 4:
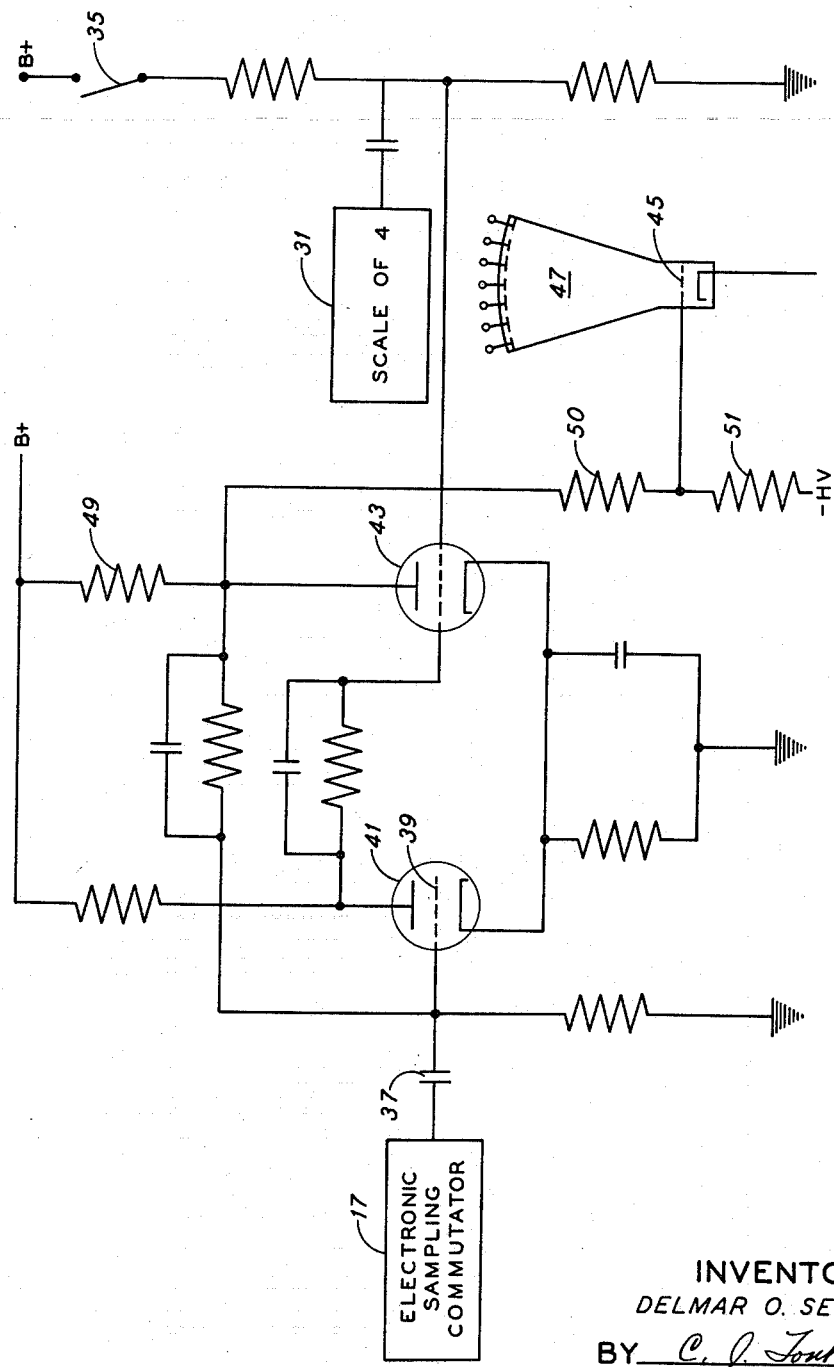
Fig. 4 shows a schematic representation of a gate circuit.

The scale-of-four counter is two cascaded binary counters, such as those shown in Fig. 4.2, "Electronics," Elmore and Sands, 1949, page 210.

The ring counter 32 may be the apparatus shown and described on pages 603 ff. of the book, "Wave Forms," M.I.T. Radiation Laboratory Series, vol. 19. For my purpose, the circuit on page 614 is appropriate. This counter can be made to step one unit every five milliseconds. The voltage change across the cathode resistor, RC, can be used to sequentially empty the storage units. Thus, each five milliseconds it empties one of the storage units of each of the counters 21—30.

The gate circuit is shown in Fig. 4 of the present application. An output of the electronic sampling commutator 17 is impressed through a capacitor 37 on the grid 39 of the tube 41 at the twenty-fifth interval of the cycle. Assuming that the tube 41 is initially conductive and that the switch 35 is open, the sampling commutator renders the tube 41 nonconductive, causing the tube 43 to become conductive. When the tube 43 becomes conductive, it impresses a negative bias on the grid 45 of the cathode ray tube 47 by a change in the voltage across the anode resistor 49. Between the B+ and a large negative voltage are connected the resistors 49, 50 and 51. The voltage across the resistor 49 when the tube 43 is conductive is sufficient to render the cathode ray tube 47 nonconductive. This condition continues until a negative pulse from the scale-of-four counter 31 renders the tube 43 nonconductive. When the tube 43 becomes nonconductive, the tube 47 becomes conductive and the analyzer 11 operates to emit signals. The tube 47 may become conductive only if the switch 35 is open. Thus, the delay and interval timer 15 first opens the switch 35 shown in Fig. 4. Then the scale-of-four counter 31 opens the gate 16 to place the amplitude analyzer 11 in operation. Then, after a cycle in which the analyzer takes a single sample of each seismic trace, the twenty-fifth signal from the commutator 17 closes the gate 16 and stops operation of the analyzer 11 to await the beginning of the next cycle. Thus, the analyzer is in operation for one-quarter millisecond, waits for three-quarters millisecond, and then continues the cycle with a one-quarter millisecond period of activity. At the end of a preset interval, the delay and interval timer 15 closes switch 35 and analyzer is held out of operation.

Figure 3:
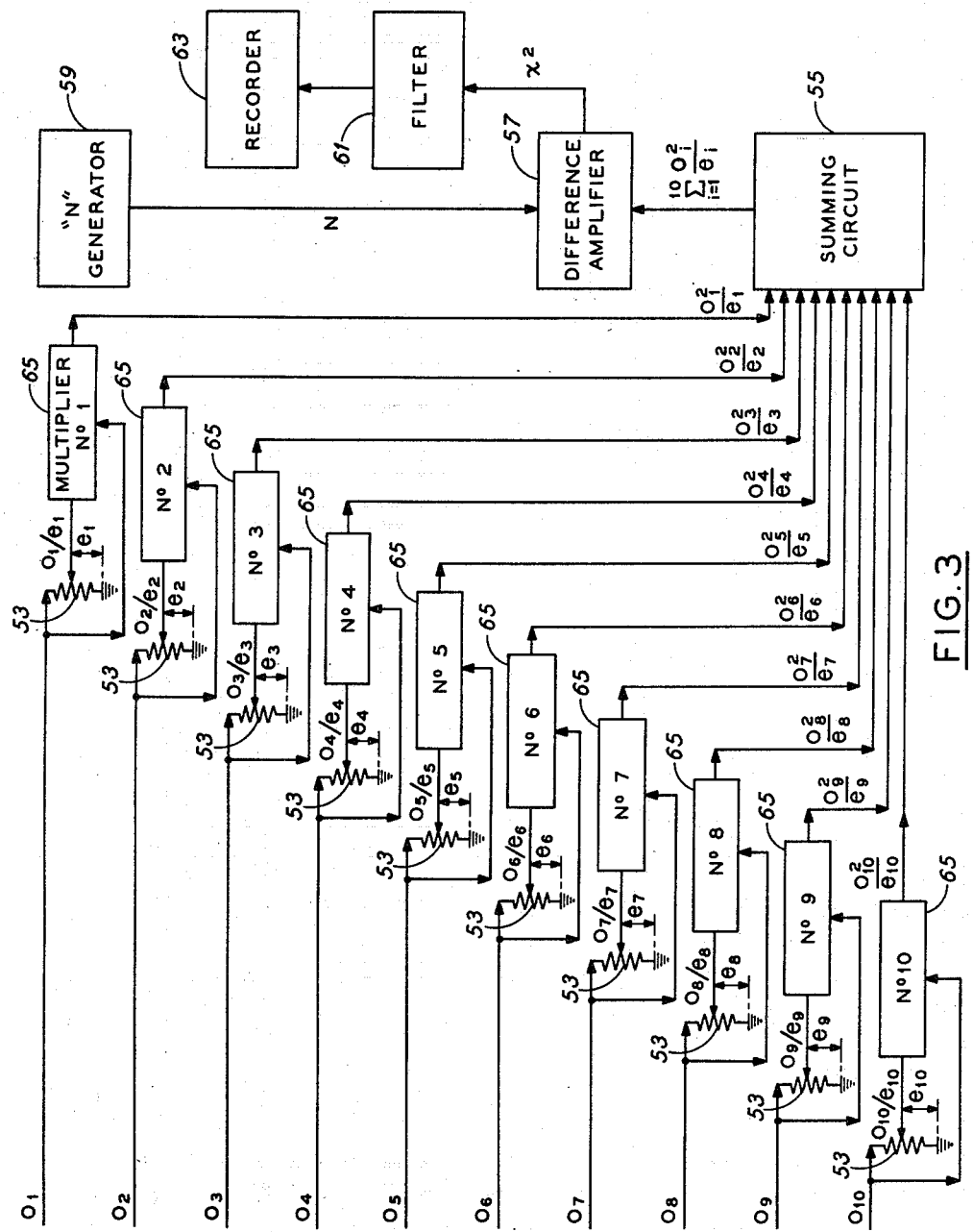

Figs. 2 and 3 show alternative circuits for computing chi-square from values for $o_i$ derived from the ten-level analyzer 11. As shown in Fig. 2, $o_i$ is fed into the ten squaring circuits 51. The output of each squaring circuit is fed through a potentiometer 53 to ground. The midtap on the potentiometer 53 is located at a point corresponding to $e_i$; that is, the resistance between ground and the tap on the potentiometer is equal to $c/e_i$ where $c$ is a constant for each potentiometer 53. The outputs derived from the taps on the potentiometers 53 are fed into the summing circuit 55. Thus the input to the squaring circuit is $o_i$. The output of the squaring circuit is equal to $o_i^2$. The inputs to the summing circuit 55 are $$\frac{o_i^2}{e_i}$$

The output of the summing circuit is the sum $$\sum_{i=1}^{10} \frac{o_i^2}{e_i}$$

The output of the summing circuit 55 is an input to the difference amplifier 57. The N generator 59 generates a voltage proportional to N which constitutes an input to the difference amplifier 57. The difference amplifier subtracts the input from the N generator 59 from the input from the summing circuit 55. This value is chi-square which is filtered in filter 61 and recorded in recorder 63.

An alternative arrangement is shown in Fig. 3 in which $o_i$ is used as an input to potentiometer 53 and to multipliers 65. The tap on the potentiometers 53 is so arranged that the resistance between the tap and ground is equal to the $c/e_i$, where $c$ is a constant. Thus, $o_i$ is fed into the potentiometer, the output of which is equal to $$\frac{o_i}{e_i}$$

This value $$\frac{o_i}{e_i}$$

is multiplied by $o_i$ in the multiplier 65. The output of the multiplier 65, $$\frac{o_i^2}{e_i}$$

is fed into the summing circuit 55, and chi-square is obtained in the difference amplifier 57, filtered, and recorded in the recorder 63 as described with reference to Fig. 2.

I have described my invention with reference to specific embodiments thereof. I am aware, however, that many modifications of it may be made without deviating from our invention. I do not intend, therefore, to limit my invention except as set forth in the appended claims.

I claim:

1. Apparatus for analyzing a plurality of seismic signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, a commutator for sequentially connecting each of said seismic signals to the input of said amplitude analyzer, recording means connected to said output circuits of said analyzer for counting said output pulses, a plurality of storage means selectively connectable to each of said output circuits of said analyzer for individually storing pulses indicative of a predetermined amplitude of said seismic signals, preprogrammed timing means for initiating an output signal from said storage means indicative of said individually stored pulses, a plurality of mathematical squaring networks for squaring said output signals of said storage means, a plurality a dividing networks for dividing the different squared signals from said squaring networks by a signal indicative of said over-all amplitude distribution of said seismic signals and for producing a divided output signal, summing means for summing all of said divided output signals from said dividing networks to produce a summed signal, means for determining the difference between said summed signal and a constant quantity indicative of the total number of seismic signals analyzed, and means for recording this difference as an indication of the degree of similarity between the instantaneous amplitudes of said signals and the over-all amplitude distribution of said signals.

2. Apparatus for analyzing a plurality of seismic signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, a commutator for sequentially connecting each of said seismic signals to the input of said amplitude analyzer, recording means connected to said output circuits of said analyzer for counting said output pulses, a plurality of storage means selectively connectable to each of said output circuits of said analyzer for individually storing pulses indicative of a predetermined amplitude of said seismic signals, preprogrammed timing means for initiating an output signal from said storage means indicative of said individually stored pulses, a plurality of mathematical squaring networks for squaring said output signals of said storage means, a plurality of dividing networks for dividing the different squared signals from said squaring networks by a signal indicative of said over-all amplitude distribution of said seismic signals and for producing a divided output signal, summing means for summing all of said divided output signals from said dividing networks to produce a summed signal, a difference amplifier for determining the difference between said summed signal and a constant quantity indicative of the total number of seismic signals analyzed, and means for recording this difference as an indication of the degree of similarity between the instantaneous amplitudes of said signals and the over-all amplitude distribution of said signals.

3. Apparatus for analyzing a plurality of seismic signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, a commutator for sequentially connecting each of said seismic signals to the input of said amplitude analyzer, recording means connected to said output circuits of said analyzer for counting said output pulses to produce an indication of the over-all amplitude distribution of said signals, a plurality of storage means selectively connectable to each of said output circuits of said analyzer for individually storing pulses indicative of a predetermined amplitude of said seismic signals, preprogrammed timing means for initiating an output signal from said storage means indicative of said individually stored pulses, a plurality of mathematical squaring networks for squaring said output signals of said storage means, a plurality of dividing networks for dividing the different squared signals from said squaring networks by a signal indicative of a measure of said over-all amplitude distribution of said seismic signals and for producing a divided output signal, summing means for summing all of said divided output signals from said dividing networks to produce a summed signal, means for determining the difference between said summed signal and a constant quantity indicative of the total number of seismic signals analyzed, and means for recording this difference as an indication of the degree of similarity between the instantaneous amplitudes of said signals and the over-all amplitude distribution of said signals.

4. Apparatus for analyzing a plurality of seismic signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, said amplitude analyzer being operative to analyze said signals in a plurality of amplitude ranges corresponding to said plurality of output circuits, a commutator for sequentially connecting each of said seismic signals to the input of said amplitude analyzer, recording means connected to said output circuit of said analyzer for counting said output pulses in each of said amplitude ranges to produce an indication of the over-all distribution of each of said amplitude ranges, storage means selectively connectable to each of said output circuits of said analyzer for individually storing pulses indicative of a predetermined amplitude range of said seismic signals, preprogrammed timing means for initiating an output signal from said storage means indicative of said individually stored pulses, a plurality of mathematical squaring networks for squaring said output signals of said storage means, a plurality of dividing networks for dividing each of the different squared signals from said squaring networks by a signal representative of the over-all distribution of the corresponding amplitude range and for producing a divided output signal, summing means for summing all of said divided output signals from said dividing networks to produce a summed signal, means for determining the difference between said summed signal and a constant quantity indication of the total number of seismic signals analyzed, and means for recording this difference as an indication of the degree of similarity between the instantaneous amplitudes of said signals and said over-all amplitude distribution of said signals.

5. Apparatus for analyzing a plurality of seismic signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, a commutator for sequentially connecting each of said seismic signals to the input of said amplitude analyzer, recording means connected to said output circuit of said analyzer for counting said output pulses, a plurality of storage means selectively connectable to each of said output circuits of said analyzer for individually storing pulses indicative of a predetermined amplitude of said seismic signals, preprogrammed timing means for initiating an output signal from said storage means indicative of said individually stored pulses, a mathematical squaring means for squaring said output signals of said storage means, a plurality of dividing networks for dividing a plurality of quantities corresponding to the over-all amplitude distribution of said signals by a quantity corresponding to the number of pulses in each of said storage means, means for multiplying the different quantities resulting from said division by said quantities corresponding to said over-all amplitude distribution and for producing a multiplied output signal, summing means for summing all of said multiplied output signals from said multiplying networks to produce a summed signal, means for determining the difference between said summed signal and a constant quantity indicative of the total number of seismic signals analyzed, and means for recording said difference signal as an indication of the degree of similarity between the instantaneous amplitude of said signals and said over-all amplitude distribution of said signals.

6. Apparatus for analyzing a plurality of signals to determine the degree of similarity between the instantaneous amplitudes of said signals and the over-all amplitude distribution of said signals, comprising an amplitude analyzer having a plurality of output circuits for producing output pulses dependent upon the instantaneous amplitude of the input signal to said analyzer, a commutator for sequentially connecting each of said signals to the input of said amplitude analyzer, recording means connected to said output circuits of said analyzer for counting said output pulses, a plurality of storage means selectively connectable to each of said output circuits of said analyzer for individually storing pulses indicative of a predetermined amplitude of said signals, preprogrammed timing means for initiating an output signal from said storage means indicative of said individually stored pulses, a plurality of mathematical squaring networks for squaring the output signals of said storage means, a plurality of dividing networks for dividing the different squared signals from said squaring networks by a signal indicative of said over-all amplitude distribution of said seismic signals and for producing a divided output signal, summing means for summing all of said divided output signals from said dividing networks to produce a summed signal, means for determining the difference between said summed signal and a constant quantity indicative of the total number of seismic signals analyzed, and means for recording this difference as an indication of the degree of similarity between the instantaneous amplitudes of said signals and the over-all amplitude distribution of said signals.

References Cited in the file of this patent

UNITED STATES PATENTS

| | | |
|---|---|---|
| 2,558,447 | MacSorley | June 26, 1951 |
| 2,679,356 | Briers | May 25, 1954 |
| 2,688,441 | Merrill et al. | Sept. 7, 1954 |

OTHER REFERENCES

"32-Channel High-Speed Commutator" (Alpert, Luongo and Wiener), Electronics, November 1950, pages 94–97.